Patented Aug. 31, 1954

2,688,000

UNITED STATES PATENT OFFICE 2,688,000

TREATMENT OF AQUEOUS LIQUORS CONTAINING THIOCYANATES

Theodore Roger Ernest Kressman and Henry Michael Spiers, London, England, assignors to The Permutit Company Limited, London, England, a British company, Stewarts & Lloyds Limited, Glasgow, Scotland, a British company, and The Woodall-Duckham Vertical Retort and Oven Construction Company (1920) Limited, London, England, a British company No Drawing. Application March 26, 1951, Serial No. 217,682

Claims priority, application Great Britain January 30, 1951

4 Claims. (Cl. 210—24)

This invention relates to processes for removing thiocyanate from industrial aqueous liquors such as gasworks effluents.

It is well known that such effluents cannot be discharged into streams without treatment but rather must first be purified. This purification can be effected by anion exchange as described in British patent specification No. 592,767. Hitherto the process has been carried out by passing the liquor to be treated through a bed of an anion-exchange material containing replaceable mineral acid anions to bring about exchange of these for the thiocyanate ions, the process depending on the fact that the anions of thiocyanates are taken up in preference to the anions of mineral acids. Since the usual process depends on this preferential exchange, the complete cycle (so far as the bed is concerned) comprises three change stages instead of the two (working stage and regeneration) usual in ion-exchange processes, that is to say, the thiocyanate must be removed from the bed by treatment of the bed with ammonia or other alkali and thereafter the bed must be treated with a mineral acid to make it ready for re-use.

Now this process is satisfactory when there are no large concentrations of other anions also present in the liquor, as then the majority of the anions taken up from the mineral acid will be exchanged for the anions of the thiocyanate. However, most gasworks effluents contain substantial quantities of other anions, e. g. chloride ions. As a result of the presence of these, the anion-exchange reaction which takes place when the liquor is passed through the bed cannot proceed very far, with the result that only a small part of the chloride (or other mineral acid) anions taken up by the anion-exchange material has been exchanged by the time that thiocyanate appears in the effluent liquor. Accordingly, when the bed is regenerated by successive treatments with ammonia and hydrochloric acid, most of the ammonia serves only to remove unexchanged chloride ions and only a small amount is used to remove thiocyanate; this is wasteful both in hydrochloric acid and in ammonia, although the ammonia can be recovered for re-use.

A further object is to increase the volume of thiocyanate-containing liquor which can be treated between successive regenerations of the anion-exchange material.

In co-pending application Serial No. 217,681, filed March 26, 1951, H. R. Bott and one of us (H. M. Spires) have described a process by which a number of advantages are obtained. This process is dependent upon the peculiar properties of anion-exchange materials, which differ considerably in their ability to exchange anions. Some, e. g. those prepared by the condensation of aniline derivatives or metaphenylene diamine with formaldehyde, are so weakly basic that when activated with an alkali they have substantially no power of taking up the anions of salts, but only those of acids. Others, e. g. those formed by chloromethylating and then aminating copolymers of styrene and di-vinyl benzene, are so strongly basic that when activated with a strong alkali they become charged with hydroxyl ions and then will take up practically every anion in a liquid. These materials also possess the characteristic that, when they are substantially exhausted, they cannot be regenerated with ammonia but only with a stronger alkali. A third class, exemplified by the condensation product of a polyalkylene-polyamine and phenol, acetone or melamine with formaldehyde, is capable both (when charged with hydroxyl ions) of exchanging these for the anions of ammonia chloride and (when exhausted) of being regenerated with ammonia.

The invention described in the said application Serial No. 217,681, filed March 26, 1951, and also the present invention, are based on the discovery that if the liquor to be treated is passed through a bed of an anion-exchange material of this third class charged with hydroxyl ions there is a preferential removal of thiocyanate ions and the liquor emerging from the anion-exchange material is low in or substantially free from thiocyanate ions, while the other anions present in it largely pass through the bed unchanged. Furthermore, by reducing the pH of the liquor before passing it through the bed, the proportion of thiocyanate anions to other anions taken up by the anion-exchange material can be increased. The pH reduction in the said Bott and Spiers process is effected by adding mineral acid to the liquor. When the thiocyanate content of the effluent liquor changes in the course of the run, i. e. either thiocyanate appears in the effluent or the thiocyanate content begins to rise, the flow is stopped and the bed is regenerated by treatment with an alkali, which may be an aqueous solution of ammonia, e. g. a 12% solution. A dilute solution of caustic soda or sodium carbonate may be used as the alkali instead of ammonia.

After passage of this solution through the bed, the excess ammonia is washed away from the bed with water and the bed is then ready to treat a fresh quantity of liquor.

By this process the amount of alkali required for regeneration of the bed for a given amount of thiocyanate removed from the liquor is considerably less than in the process used hitherto as described in British specification No. 592,767, because it is dependent only on the quantity of anions removed from the liquor during the treatment and not on the much greater quantity of mineral acid anions put into the bed in the regeneration stage of the process described in British specification No. 592,767.

Generally, the object of the process is two-fold, namely to purify the liquor to such an extent that it can be discharged into a stream and to collect the thiocyanate in as high a concentration as possible for disposal by combustion or otherwise. In carrying out the process, the effluent during the stage in which an alkaline solution is passed through the bed to displace the thiocyanate ions taken up by the bed is collected for disposal. After the passage of this solution the bed is washed with water and used for the treatment of further liquor.

Not only is there a substantial saving in regenerant in this Bott and Spiers process, but also the amount of liquor containing thiocyanate that must be disposed of is reduced. The reason is that as less regenerant has to be passed through the bed in the step of displacing thiocyanate, the resultant effluent is of smaller volume and therefore more easily disposed of. This is a substantial advantage.

The actual capacity of the bed for the removal of thiocyanate is another important factor. As explained above, it is necessary to ensure that the thiocyanate content of the purified effluent is low. Since, however, there is very considerable dilution when the effluent enters a stream, it is not always necessary to ensure that at no instant does the thiocyanate content of the effluent rise above a specific value; rather it is enough to ensure that over a period of time the total amount of thiocyanate discharged into the stream is not too high. For this reason, the limiting factor which determines when the ion-exchange material must be regenerated is the thiocyanate content of the total purified effluent, which may conveniently be described as the bulk effluent. A practical upper limit for this content is 30 p. p. m. In other words, if all the effluent during the working run (in which thiocyanate is taken up by the ion-exchange material) is collected, the run must be stopped when the thiocyanate content of this collected or bulk effluent reaches 30 p. p. m. The volume of the bulk effluent is therefore a measure of the capacity of the bed.

In any ion-exchange process an increase in capacity is desirable because it allows more liquid to be treated between regenerations, but in the treatment of liquors containing thiocyanate the increase is doubly important because it is found that the efficiency of the regeneration increases with the capacity and so the ratio of treated liquor to regenerant increases also. This means that the ratio of the volume of effluent in the regenerating stage to the volume of treated liquor is reduced, so that for a given volume of treated liquor the volume of concentrated thiocyanate is further reduced and therefore more easily disposed of.

The essence of the present invention is modification of the Bott and Spiers process in that instead of effecting the pH reduction by adding mineral acid to the liquor, we use a weak acid. We find that the capacity for the removal of thiocyanate is then appreciably increased. Preferably the weak acid is carbonic acid and in carrying out the process we prefer to saturate the liquor with carbon dioxide by passing this gas through the liquor so as to form carbonic acid in the liquor.

Not only is the capacity for thiocyanate removal increased by using a weak acid, but because the pH of the treated liquor is not reduced to the same extent as when mineral acid is used (the pH may vary between 5 and 9) the liquor is rendered less corrosive.

In general, any thiosulphate will behave in the same way as thiocyanate, and the references made above and in the claims to thiocyanate include any thiosulphate present. However, with some liquors the thiosulphate content of the effluent is found to be higher than is desirable while the thiocyanate content has been satisfactorily reduced. In such a case the effluent may be passed through a bed of anion-exchange material which has been successively regenerated with an alkali and an acid.

To show the improvement brought about by means of the invention, some experimental results will be given. In each of the experiments use was made of a bed of anion-exchange resin which had been made by the condensation of tetraethylene-pentamine with phenol and formaldehyde. The bed was used for treating a liquor containing 150 p. p. m. of CNS and 110 p. p. m. of $S_2O_3$ (as ammonia salts) together with 0.4% ammonium chloride. The effluents were collected and tested for thiocyanate, the runs being stopped when the thiocyanate concentration in the bulk effluent reached 30 p. p. m. In each case, when a volume of bulk effluent had been found, the minimum amount of regenerant which yielded this volume of bulk effluent was also determined.

*Example 1*

A bed having a volume of 150 cc. was used. It was first activated by the standard process used hitherto, being treated successively with ammonia in the form of a 12% solution and then with hydrochloric acid in the form of a 3% solution. It was found that the maximum amount of liquor which could be treated before the thiocyanate concentration in the bulk effluent rose to 30 p. p. m. was 15 litres. The minimum amount of regenerant which yielded this volume of effluent was 22 grams of ammonia followed by 24 grams of hydrochloric acid. The ratio of purified liquor to regenerant effluent was 84:1.

Next the bed was regenerated simply with ammonia as a 12% solution and then washed with water. Before being passed through this bed the liquor was acidified with hydrochloric acid so that it contained 60 p. p. m. of hydrochloric acid. It was found that the maximum volume of liquor which could be treated before the thiocyanate concentration in the bulk effluent rose to 30 p. p. m. was only 8 litres, and the minimum amount of ammonia which yielded this effluent was 6 grams. The ratio of purified liquor to regenerant effluent was 160:1.

Finally, the bed was again regenerated with ammonia as a 5% solution and then washed with water. This time the liquor was first saturated with carbon dioxide before being passed through the bed. It was found possible to obtain a maximum of 17 litres of liquor with a thiocyanate concentration of 30 p. p. m. upon passage through this bed and the minimum amount of ammonia required to produce this maximum volume was 10 grams. It will be seen that not only was the capacity of the bed distinctly higher than when hydrochloric acid was added to the liquor, but also the amount of regenerant required per unit volume of treated liquor was less. Moreover, the pH of the liquor was also higher. In this case the ratio of purified liquor to regenerant effluent was 200:1.

*Example 2*

Example 1 was repeated, but using 2 grams of acetic acid per litre of liquor instead of carbon dioxide. On passing the acidified liquor through the bed of resin a maximum of 15 litres of liquor was obtained, and the minimum amount of ammonia required to produce this maximum volume was 9 grams. The ratio of purified liquor to regenerant effluent was 200:1.

*Example 3*

Two 150 cc. beds of the resin were arranged in columns, the first being activated with 170 cc. of 6% ammonia, and the second with 200 cc. of 6% ammonia followed by 700 cc. of 3% hydrochloric acid. The liquor containing 150 p. p. m. CNS, 110 p. p. m. $S_2O_3$ and 0.8% ammonium chloride was saturated with carbon dioxide as in Example 1 and passed successively through the two columns in the order given above. The CNS and $S_2O_3$ were not completely removed by the first column, but their concentrations in the effluent from the column remained constant for a long period before a steady rise indicated the end of the run. The steady values were 6–10 p. p. m. CNS and 8–11 p. p. m. $S_2O_3$. After passing through the second column the effluent contained less than 3 p. p. m. CNS and 4–5 p. p. m. of $S_2O_3$.

We claim:

1. A process for the treatment of an aqueous industrial liquor containing thiocyanate salts and other anions in the form of their salts, comprising adding a weak acid selected from the group consisting of carbonic acid and acetic acid to said liquor to reduce the pH of said liquor to a value between 5 and 9, thereafter passing said liquor through an alkali-activated bed of anion-exchange material capable when charged with hydroxyl ions of exchanging these for the anions of ammonium chloride and when exhausted of being regenerated with ammonia, stopping the flow through said bed when the thiocyanate content of the effluent therefrom changes, passing an alkaline solution through said bed whereby thiocyanate ions taken up by said bed are displaced, collecting the effluent containing these ions for disposal, washing said bed with water and using said alkali-regenerated and washed bed for the treatment of further liquor.

2. A process for the treatment of an aqueous industrial liquor containing thiocyanate salts and other anions in the form of their salts which comprises adding a weak acid selected from the group consisting of carbonic acid and acetic acid to said liquor to reduce the pH of said liquor to a value between 5 and 9, and then passing such liquor through a bed of an alkali-activated anion exchange material which anion exchange material is capable, when charged with hydroxyl ions, of exchanging these for the anions of ammonium chloride and when exhausted, of being regenerated with ammonia.

3. A process according to claim 2 in which said liquor is saturated with carbon dioxide to effect the reduction in pH with carbonic acid.

4. A process in accordance with claim 2 in which said alkali-activated anion exchange material is an alkali-activated anion exchange condensation product of a polyalkylene-polyamine, formaldehyde, and at least one member of the group consisting of phenol, acetone and melamine.

References Cited in the file of this patent

UNITED STATES PATENTS

| Number | Name | Date |
| --- | --- | --- |
| 2,259,169 | Little | Oct. 14, 1941 |
| 2,404,367 | Durant et al. | July 23, 1946 |
| 2,442,989 | Sussman | June 8, 1949 |

FOREIGN PATENTS

| Number | Country | Date |
| --- | --- | --- |
| 592,767 | Great Britain | Sept. 29, 1947 |